Jan. 31, 1950 J. E. SHEPHERD ET AL 2,495,780

DAMPED SHOCK EXCITED VARIABLE WIDTH PULSE GATE GENERATOR

Filed April 2, 1943

INVENTORS
JAMES E. SHEPHERD
ROBERT F. MOZLEY
BY Paul B. Hunter
ATTORNEY

Patented Jan. 31, 1950 2,495,780

UNITED STATES PATENT OFFICE 2,495,780

DAMPED SHOCK EXCITED VARIABLE WIDTH PULSE GATE GENERATOR

James E. Shepherd and Robert F. Mozley, Hempstead, N. Y., assignors to The Sperry Corporation, a corporation of Delaware Application April 2, 1943, Serial No. 481,642

2 Claims. (Cl. 250—27)

This invention relates to electronic discharge circuits and, more particularly, to gate generators.

An object of the invention is to provide a circuit which will produce a narrow gate coming substantially in coincidence with the front of a square wave.

Another object of the invention is the arrangement of a circuit for producing a wide gate of steep positive slope.

A further object of the invention is to provide a circuit which will generate a pulse in the order of a fraction of a microsecond.

Another object of the invention is to provide a gate generator which produces a pulse by absorbing all but the first positive half cycle of the wave train set up in a resonant circuit by the negative discontinuity of another wave, then clipping the pulse and squaring it to form a gate.

Another object of the invention is to provide a circuit for setting up high-frequency, high-amplitude oscillations in a tuned circuit.

It is also an object of the invention to arrange a circuit in which the natural frequency of an oscillating element may be varied to form a variable wave train, portions of which are absorbed to form a pulse which is subsequently clipped and squared to form a variable width gate.

A still further object of the invention is the arrangement of a circuit for producing variable gates ranging from a pulse in the order of a fraction of a microsecond to a wide gate, in some instances exceeding several hundred microseconds.

These and other objects of the invention will become apparent as the description proceeds.

In carrying out the invention in its preferred form, a voltage wave of any suitable form is impressed on the initial stage of a multivibrator circuit where it is squared to produce a wave of steep negative slope. The negative discontinuity of this wave is then used to terminate current flow in a choke coil which together with its distributed capacitance acts as a tuned circuit. By abruptly terminating the current flow in the tuned circuit, a wave train is set up, the first half cycle of which is positive with respect to a positive energy source. The first negative half cycle of the wave is then absorbed by an unsymmetrical current-conducting device and the remainder of the wave is damped out, leaving only the first positive half cycle as a pulse which is clipped and squared in the final stages of the circuit to form a narrow gate.

A variable impedance may be connected in parallel with the choke coil, and, by a suitable switching means, it is possible to switch this impedance into or out of the circuit, as desired. When operated in the circuit, the parallel impedance may be varied to vary the natural period of oscillations within the tuned circuit which in turn produces a variable width gate.

Likewise, by substantially increasing the inductance of the choke coil with a consequent increase in distributed capacitance, it is possible to obtain a wide gate.

A more comprehensive treatment of the invention will be found in the following detailed description when considered with the accompanying drawing, in which Fig. 1 is a circuit diagram of an embodiment of the invention.

Like reference numerals have been used throughout the drawing to designate like parts.

Figure 1:
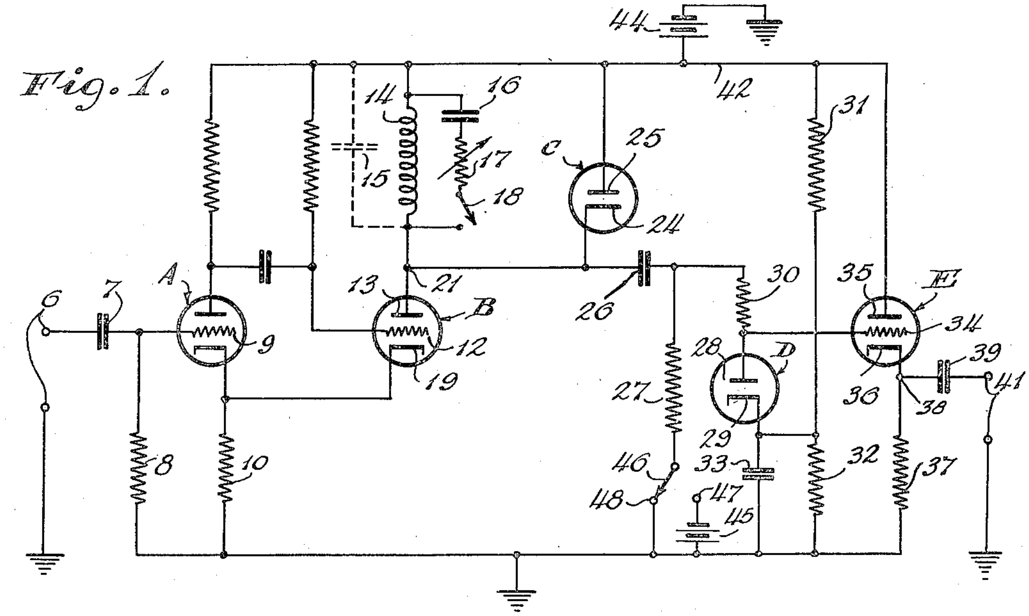

With reference to Fig. 1, a voltage of a suitable wave form is impressed on the circuit at the input terminals 6 from which it is fed to the grid 9 of the initial stage A of a cathode-coupled multivibrator-type circuit through the coupling elements 7 and 8. The final stage B of the multivibrator circuit is coupled to stage A through a common cathode resistor 10 which provides the necessary feed-back for the circuit to form a square wave of steep negative slope. Connected in the anode lead of the final stage B of the multivibrator circuit is a choke coil 14 which, together with its distributed capacitance 15, acts as a tuned circuit, or resonant element.

The output of the final stage of the multivibrator is fed to the cathode 24 of stage C, plate 25 of which is connected to the common bus 42. From stage C the wave is next fed through the coupling elements 26 and 27 to the grid 34 of stage E and also to the plate 28 of tube D through the resistor 30, which together with the resistance of tube D comprises a voltage divider. The switch 46 connected in the coupling circuit of E is normally closed to ground through contact 48, the contact 47 being used when negative bias is to be applied to the grid 34 of E for purposes hereinafter described. The cathode 29 of stage D, which acts as a clipping or amplitude limiting means, is connected to a voltage divider comprising the resistors 31 and 32, the latter element of which has coupled in parallel therewith the capacitor 33. Stage E, which acts as a cathode follower, has its cathode grounded through the cathode resistor 37 and its anode 35 connected to the positive energy source 44 through the common bus 42. The elements C and D may take the form of any one of the several types of unilateral or unsymmetrical current-conducting devices such as the diode vacuum tube or the rectifier.

The output of the circuit is taken from the cathode of stage E at 38 and supplied to the output terminals 41 through the capacitor 39.

Coupled in parallel with the choke coil 14, connected in the anode lead of stage B, is a capacitor 16 in series with a variable resistor 17 which is operable through switch 18. Negative bias is applied to the grid of stage E from negative energy source 45 through contact 47 of the two-way switch 46.

The operation of the circuit is as follows. Current normally flows through the choke coil 14 in the anode lead of stage B, and when negative discontinuity of a steep squared wave reaches the grid 12 of stage B, the tube becomes non-conducting. The resultant abrupt termination of the current flow sets up a wave train in the resonant element or tuned circuit comprising the choke coil 14 and its distributed capacitance 15, the first half cycle of which is positive with respect to the energy source 44. Thereafter the tube C will conduct as soon as the plate of tube B goes negative with respect to the positive energy source 44, and the unilateral current-conducting element C thus absorbs most of the energy of the first negative half cycle and damps out the remaining portion of the wave train established in the tuned circuit. Accordingly, only the first positive half cycle is left as a pulse, and this is fed to the grid of buffer stage E.

The diode D, or clipping element, is placed in the circuit to clip the top of the pulse, impressed on the grid of the stage E, thus flattening it and controlling its height. It is aided in performing this function by the resistor 30 which in conjunction with the tube resistance acts as a voltage divider the moment element D becomes conducting. The resistors 31 and 32 act as voltage dividers to give a reference point for the clipping of the pulse, and, when the circuit is acting with switch 46 closed to terminal 47, the value of negative bias also becomes a controlling factor in establishing this reference and in determining the amplitude of the pulse or gate. Thus, by maintaining the clipping level of element D constant with respect to the height of the wave impressed on it, negative bias on the grid of tube E may be varied to control the amplitude of the pulse or gate generated.

Figure 2:
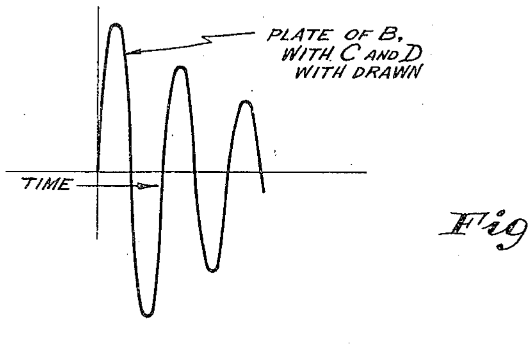
Fig. 2 is a graphical representation showing the variation of plate voltage of stage B in Fig. 1 with stages C and D withdrawn.
Figure 3:
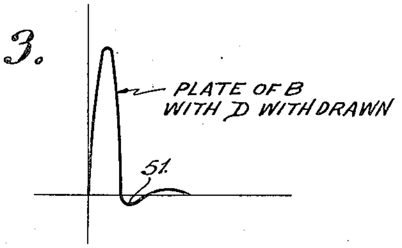
Fig. 3 is a similar showing of the variation of the plate voltage of stage B in Fig. 1 with stage D withdrawn.
Figure 4:
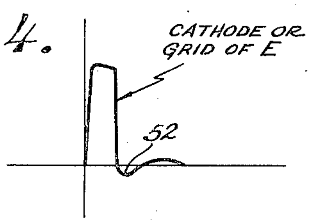
Fig. 4 shows the variation of cathode and grid voltage of the stage E of the circuit shown in Fig. 1.

The functions of the several stages of the circuit are illustrated in Figs. 2, 3 and 4 by showing the voltage waves obtaining at various points within the circuit with specific elements withdrawn. Fig. 4 shows one form of the output of the circuit at the terminals 41 which by application of the modifications shown and described may be varied in width from a pulse to a wide gate such as that illustrated as the cathode voltage of tube E in Fig. 5.

In some applications the wave form shown in Fig. 2 is useful, and in such instances it may be taken directly from the circuit at terminal 21 if subsequent stages are eliminated. By operating the tuned circuit in conjunction with the multivibrator-type circuit as described, it is possible to generate high-frequency, high-amplitude waves of this form.

Figure 5:
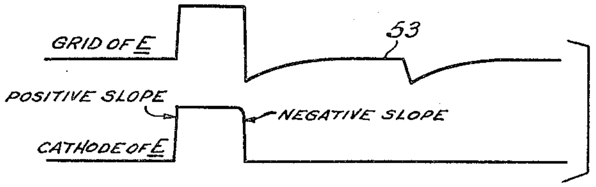
Fig. 5 shows the variation in grid and cathode voltage of stage E of Fig. 1 when the circuit is operating as a wide gate generator.

It will be noted in Fig. 3 that the pulse shown has a tail 51, that a similar over-shoot 52 is present in the gate illustrated in Fig. 4, and that this condition 53 becomes pronounced in the gate shown as the grid voltage of tube E in Fig. 5. The voltage variation which produces this effect is due partially to the resistance of element C and very slightly to differentiation of the wave by the capacitor 26 and resistor 30.

Inasmuch as this portion of the wave is objectionable, paticularly in the wide gate, provision is made to eliminate it, and such is another function of applying negative bias to the grid of tube E. Here, as the grid of tube E goes negative under the application of bias from source 45, the cut-off level of the tube is raised and the tail of the pulse or gate is erased.

Since the pulse generated in the tuned circuit starts after the negative wave front from which it is produced, it is possible to synchronize the circuit very accurately. The width of the pulse, unless the clipping action of amplitude-changing means D absorbs an excess amount of energy, is determined entirely by the natural frequency of the tuned circuit and can thus be accurately controlled. Likewise, the height of the pulse is not limited by the positive energy source 44 but is determined by the amount of current flowing through the coil 14 before it is interrupted, by the sharpness of the negative discontinuity, by the inductance of coil 14, and, in the instances where stage E is operating in the circuit, by the amount of negative bias applied to the grid thereof.

In a modification of the above-described operation, the switch 18 may be closed to place the variable resistor 17 and the capacitor 16 in series therewith in parallel across the choke coil 14 in the anode lead of stage B, in which case the natural frequency of the tuned circuit formed by the coil 14 and its distributed capacitance 15 may be varied by adjustment of the element 17 to form a gate of variable width.

Another modification of the above-described circuit may be obtained in the case where a wide gate is to be generated by substantially increasing the inductance of the choke coil 14 and closing the two-way switch 46 to contact 47 which applies negative bias to the grid of the buffer stage E. Under such operation and without the application of negative bias, the wave form shown as the grid voltage of stage E in Fig. 5 is obtained. By applying negative bias to buffer stage E, the tail 53 of the wave is removed and the sharp wide gate, shown in Fig. 5 as the cathode voltage of stage E, is produced.

In the circuit illustrated, the choke coil 14 is shown as being placed in the anode lead of the final stage of a multivibrator circuit. It is to be understood, of course, that the invention is not limited to the precise arrangement illustrated and that the purposes of the same can be carried out by the stage B operating as an amplifier with a voltage wave having any steep negative slope impressed on the grid thereof. It is also to be noted that the tube E operates solely as a buffer stage and may be omitted whenever the output of the circuit is to be used in high impedance circuits.

Other modifications of the invention of course are possible and may become apparent in view of the disclosures herein made. Accordingly, the representations shown and described are to be taken as illustrative only, and the scope of the invention is to be limited solely by the appended claims.

What is claimed is:

1. In a circuit having input and output terminals, an electronic discharge device having a cathode, a grid and an anode, means for impressing a wave of steep negative slope upon said grid, a resonant element connected in the anode lead of said discharge device, variable impedance means comprising a fixed capacitor and variable resistor series combination in parallel with said resonant element, a unilateral current-conducting element for absorbing portions of a wave train set up in said resonant element by abrupt termination of its current flow, means for modifying the amplitude of the pulse output of said unilateral current-conducting device, and a negative-biased cathode follower coupled between the output of said amplitude-modifying means and said output terminals, said variable resistor of said variable impedance being adjustable to deliver a variable width gate at the output terminals of the circuit.

2. In a circuit having input and output terminals, an electronic discharge device having a resonant element connected in the anode lead thereof, means for impressing a wave of steep negative slope upon the control electrode of said electronic discharge device, variable impedance means comprising a fixed capacitor and variable resistor series combination in parallel with said resonant element, a unilateral current-conducting element for absorbing portions of a wave train set up in said resonant element by abrupt termination of the current flow therein, and means for modifying the amplitude of the pulse output of said unilateral current-conducting device, said variable resistor of said variable impedance being adjustable to deliver a variable width gate at the output terminals of the circuit.

JAMES E. SHEPHERD.
ROBERT F. MOZLEY.

REFERENCES CITED

The following references are of record in the file of this patent:

UNITED STATES PATENTS

| Number | Name | Date |
|---|---|---|
| 1,996,403 | Buckingham | Apr. 2, 1935 |
| 2,063,025 | Blumlein | Dec. 8, 1936 |
| 2,103,090 | Plebanski | Dec. 21, 1937 |
| 2,113,214 | Luck | Apr. 5, 1938 |
| 2,139,432 | Andrieu | Dec. 6, 1938 |
| 2,149,077 | Vance | Feb. 28, 1939 |
| 2,153,202 | Nichols | Apr. 4, 1939 |
| 2,159,493 | Wright | May 23, 1939 |
| 2,181,309 | Andrieu | Nov. 28, 1939 |
| 2,181,568 | Kotowski et al. | Nov. 28, 1939 |
| 2,226,459 | Bingley | Dec. 24, 1940 |
| 2,227,050 | White et al. | Dec. 31, 1940 |
| 2,237,661 | Ernst | Apr. 8, 1941 |
| 2,249,420 | Engbert et al. | July 15, 1941 |
| 2,266,668 | Tubbs | Dec. 16, 1941 |
| 2,277,000 | Bingley | Mar. 17, 1942 |
| 2,303,511 | Tawney | Dec. 1, 1942 |
| 2,408,061 | Grieg | Sept. 24, 1946 |
| 2,413,956 | Coykendall | Jan. 7, 1947 |
| 2,431,591 | Snyder et al. | Nov. 25, 1947 |
| 2,440,547 | Jensen | Apr. 27, 1948 |

OTHER REFERENCES

Proc. of I. R. E., vol. 28, No. 9, September 1940, "Generation of Synchronizing Pulses by Impulse Excitation" by Sherman, pp. 406 to 409.